United States Patent [19]

Gerigk et al.

[11] Patent Number: 5,490,939
[45] Date of Patent: Feb. 13, 1996

[54] PROCESS FOR RECONCENTRATING OVERSPRAY FROM ONE-COMPONENT COATING COMPOSITIONS

[75] Inventors: Markus Gerigk; Jochen Brück, both of Köln; Wieland Hovestadt, Krefeld, all of Germany

[73] Assignee: Bayer Aktiengesellschaft, Leverkusen, Germany

[21] Appl. No.: 393,646

[22] Filed: Feb. 24, 1995

[30] Foreign Application Priority Data

Mar. 3, 1994 [DE] Germany .................... 44 06 952.9

[51] Int. Cl.$^6$ ................................................ B01D 61/00
[52] U.S. Cl. ..................... 210/652; 210/651; 210/641; 134/38
[58] Field of Search .................... 210/650, 651, 210/652, 653, 654, 641; 134/38

[56] References Cited

U.S. PATENT DOCUMENTS

| | | | |
|---|---|---|---|
| 4,607,592 | 8/1986 | Richter | 118/689 |
| 5,092,928 | 3/1992 | Spangler | 210/703 |
| 5,242,596 | 9/1993 | Bachem et al. | 210/644 |
| 5,282,970 | 2/1994 | Wede | 210/641 |
| 5,292,547 | 3/1994 | Schlumpf et al. | 427/8 |
| 5,393,390 | 2/1995 | Freese et al. | 204/131 |

FOREIGN PATENT DOCUMENTS

| | | |
|---|---|---|
| 2094435 | 10/1993 | Canada . |
| 553684 | 4/1993 | European Pat. Off. . |
| 2353469 | 4/1975 | Germany . |
| 3428300 | 2/1986 | Germany . |
| 2063096 | 6/1981 | United Kingdom . |

Primary Examiner—Ana M. Fortuna
Attorney, Agent, or Firm—Joseph C. Gil; Thomas W. Roy

[57] ABSTRACT

The present invention relates to a multi-stage membrane filtration process for reconcentrating the overspray from a one-component, aqueous coating composition containing high molecular weight components having a weight average molecular weight of at least 2000 and at least 5% by weight, based on the total weight of the organic components of the coating composition, of a low molecular weight component having a weight average molecular weight of less than 2000, that has been diluted with spray booth water from spray booths having wet flushing to form a booth/water overspray mixture by a) preconcentrating the booth water/overspray mixture in an ultrafiltration unit to obtain a first retentate containing high molecular weight components and a first permeant containing water and at least a portion of the low molecular weight components, b) treating said first permeant and the third permeant obtained in step c) below in a reverse osmosis unit to obtain a second permeant containing essentially pure water for recycle as booth water and a retentate containing low molecular weight components, c) treating said first and second retentates in a nanofiltration unit to obtain a third permeant containing water and a minor portion of low molecular weight components and a third retentate which largely corresponds in composition and concentration to said one-component, aqueous coating composition.

6 Claims, 3 Drawing Sheets

PROCESS FOR RECONCENTRATING OVERSPRAY FROM ONE-COMPONENT COATING COMPOSITIONS

BACKGROUND OF THE INVENTION

1. Field of the Invention

The present invention relates to a process for reconcentrating the overspray of one-component, aqueous coating compositions from spray booths having wet extraction by a multi-stage membrane process using the resulting permeant as booth water and using the resulting retentate as an aqueous coating composition or as a constituent of an aqueous coating composition.

2. Description of the Prior Art

The term "overspray" means those coating components that miss the target substrate during spray application of the coating and in the absence of particular precautions are lost.

Increasing environmental problems have prompted the recent development of a wide variety of processes aimed at reducing the volume of special waste arising from coatings overspray. Conventionally, the overspray diluted by the spray booth water is coagulated in collecting basins for disposal. The underlying concept in some of the newer processes for water-thinnable coatings dispenses with coagulation and, instead, reconcentrates the overspray with care for reuse as a coating composition.

DE-OS 2,353,469 describes reconcentrating the overspray by ultrafiltration. The diluted overspray flows past a semipermeable membrane such that the low molecular weight substances, in particular water but also low molecular weight dissolved binder components and auxiliary substances, pass through the membrane (i.e., the permeant or penetrant), while the principal components of the coating composition are retained by the membrane (i.e., the retentate).

DE-OS 3,428,300 describes the desirability of exclusively using demineralized water as the spray booth water in order to avoid overspray coagulation. The same objective is achieved by the process described in DE-OS 2,945,523 by the addition of emulsifying agents.

EP-A-0,141,171 discloses the possibility of continuous ultrafiltration. A portion of the mixture of booth water and overspray circulated in the spray booth circuit undergoes continuous separation and ultrafiltration. The permeate is returned to the booth water. The physical and chemical properties of the retentate is checked to determine its suitability for reuse as a coating composition. The reconcentrated overspray may be reused after, for example, dilution or concentration.

WO 91/09666 describes the reworking of heat-curable, aqueous alkyd or acrylic resins by ultrafiltration in the presence of an aliphatic amine to prevent the coating compositions from coalescing and a glycol derivative to adjust the ultrafiltration throughput. These additives, however, have the disadvantages of affecting the quality of the worked-up coating composition and also polluting the exhaust air from the booth.

The new literature (for example JOT 10 (1992) 32 to 38, JOT 3 (1992) 28 to 33) discloses that the prior art ultrafiltration leads to serious problems with many coating systems, thus making it impractical. These problems may be due, for example, to a marked foaming tendency due to low molecular weight emulsifying agents or possibly low molecular weight binder components which pass into the permeant and accumulate. The lost components may be crucial to the coating quality of the recycled material, making direct reuse of the retentate as coating composition impossible.

An object of the present invention is to develop a process which enables overspray from water-thinnable coating compositions to be reworked to form new coating compositions having substantially the original composition and, thus, the original quality.

It has now surprisingly been found that this object may be achieved with the specific multi-stage membrane process described in greater detail hereinafter.

Multi-stage membrane processes are known and are applied, inter alia, in the whey, sea water, oil emulsions or latex waste water reworking sectors (see, for example, M. Mulder "Basic principles of membrane technology" Kluwer Academic Publishers (1991), R. Rautenbach, R. Albrecht "Membran-trennverfahren: Ultrafiltration und Umkehrosmose" [Membrane Separation Processes: Ultrafiltration and Reverse Osmosis], Otto Salle Verlag, Frankfurt am Main (1981) and DE-OS 4,126,483). These references describe the many possibilities, including combining ultrafiltration with reverse osmosis. The permeant from ultrafiltration, which contains low molecular weight components, is reconcentrated by reverse osmosis. The retentate from reverse osmosis is fed again into the ultrafiltration feed stream.

EP-A-0,553,684 describes a multi-stage membrane process for reconcentrating the overspray from water-dilutable coating compositions in spray booths having wet flushing, in which the booth circulation water is preconcentrated in a continuous manner in an ultrafiltration unit and the permeant is returned as circulation water. Final concentration is performed batch-wise in a further ultrafiltration unit. The permeant from the final concentration stage may be reconcentrated by a reverse osmosis stage downstream. Because there is no provision for returning the retentate from reverse osmosis into the ultrafiltration feed, it is not possible with this arrangement to recover the overspray as a coating having essentially the original composition.

EP-A 0,567,915 describes the possibility of returning the retentate from the reverse osmosis stage either into the preconcentration stage or into the final concentration stage. Reconcentration of low molecular weight components by reverse osmosis is only practical up to relatively low concentrations of at the most 5%, due to osmotic pressure build-up, so that redilution occurs as a result of returning the retentate from reverse osmosis into the ultrafiltration stages. Because of the poor retention performance of ultrafiltration in the case of soluble low molecular weight coating components, the coating composition recovered in this process does not have virtually the original composition.

SUMMARY OF THE INVENTION

The present invention relates to a multi-stage membrane filtration process for reconcentrating the overspray from a one-component, aqueous coating composition containing high molecular weight components having a weight average molecular weight of at least 2000 and at least 5% by weight, based on the total weight of the organic components of the coating composition, of a low molecular weight component having a weight average molecular weight of less than 2000, that has been diluted with spray booth water from spray booths having wet flushing, to form a booth/water overspray mixture by a) preconcentrating the booth water/overspray mixture in an ultrafiltration unit to obtain a first retentate containing high molecular weight components and a first permeant containing water and at least a portion of the low molecular weight components, b) treating said first permeant and the third permeant obtained in step c) below in a reverse osmosis unit to obtain a second permeant containing essentially pure water for recycle as booth water and a retentate containing low molecular weight components, c) treating said first and second retentates in a nanofiltration unit to obtain a third permeant containing water and a minor portion of low molecular weight components and a third retentate which largely corresponds in composition and concentration to said one-component, aqueous coating composition.

DETAILED DESCRIPTION OF THE INVENTION

Figure 1:
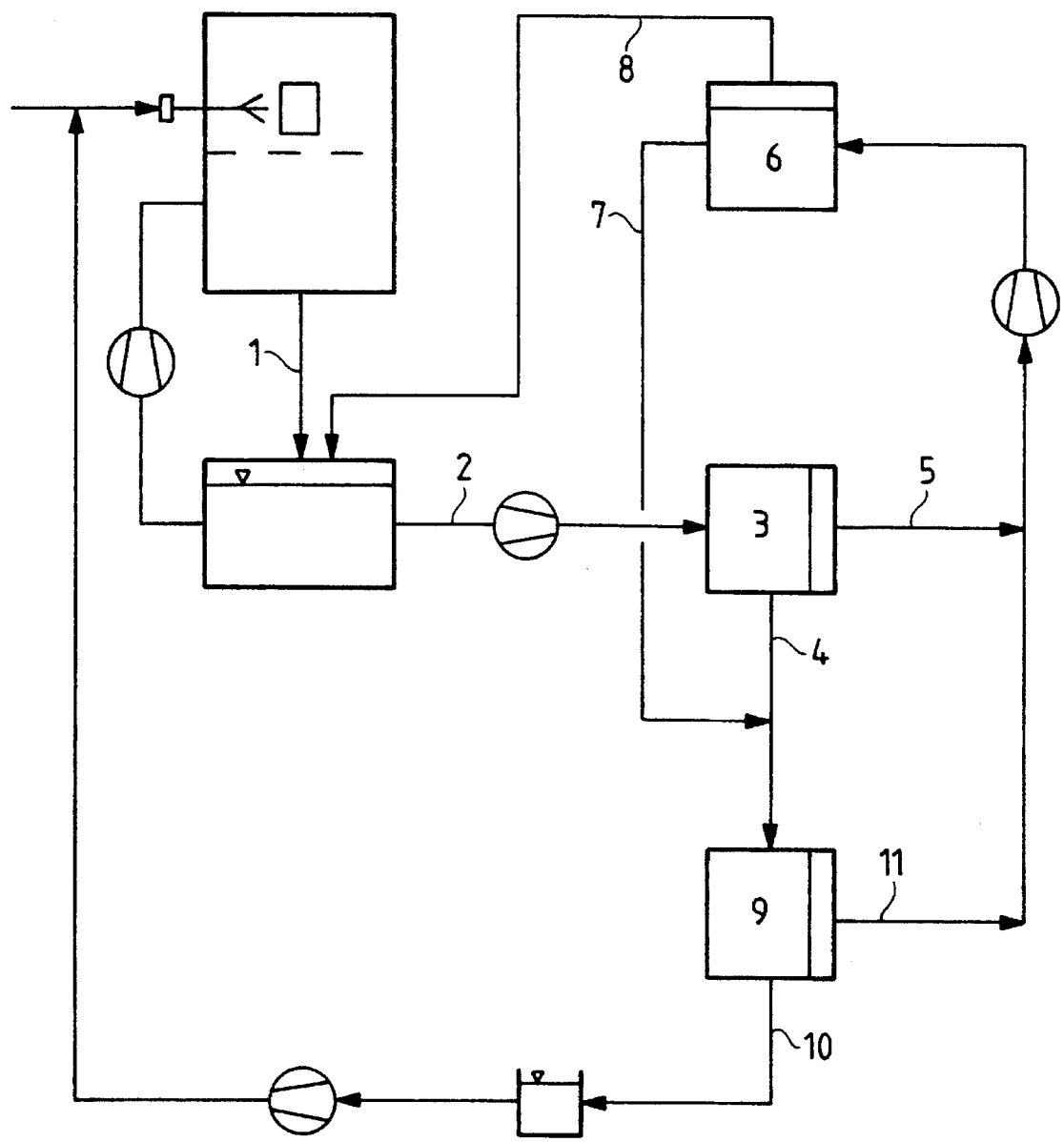
FIG. 1 is a flow chart of an embodiment of a continuous process according to the invention.

In the context of the present invention "ultrafiltration" means a known membrane separation process performed using membranes having an exclusion limit of 1,000 to 100,000, preferably from 10,000 to 100,000 g/mol, at differential pressures of 1 to 10, preferably 2 to 7 bar.

Nanofiltration is also a pressure permeation process and, in terms of separation performance, is classified between ultrafiltration and reverse osmosis (see, for example, R. Rautenbach, G. Schneider, Final Report on the DFG [German Research Association] research project on "Nanofiltration", RWTH [Technical University of Rhineland-Westphalia] in (Aachen (1993). In the context of the present invention "nanofiltration" means a known membrane separation process performed using membranes having an exclusion limit of 200 to 2,000, preferably from 500 to 1,000 g/mol, at differential pressures of 12 to 40, preferably 12 to 30 bar.

In the context of the present invention "reverse osmosis" means a known membrane separation process in which membranes are utilized that are capable of 95 wt-%, preferably at least 98 wt-%, retention of common salt. The trans-membrane pressure difference is about 15 to 100, preferably 25 to 75 bar.

The permeant flow, i.e., the speed of reconcentration, in all of the membrane separation processes previously described is influenced predominantly by the trans-membrane pressure difference. When the process according to the invention is carried out, the permeant flows are about 5 to 200, preferably 10 to 100 l/m$^2$/h in the ultrafiltration stage, about 5 to 100, preferably 10 to 75 l/m$^2$/h in reverse osmosis, and about 5 to 100, preferably 10 to 50 l/m$^2$/h in nanofiltration.

All conventional commercial membrane modules are suitable for the ultrafiltration unit utilized in the process according to the invention, such as cushion, plate, spirally wound, tubular, capillary or hollow fiber modules. Examples of materials used to manufacture the membranes include polysulphone, polyacrylonitrile, polyethylene, Teflon resin, porous carbon, ceramic, cellulose acetate, polyurea, aromatic or aliphatic polyamides, sulphonated polyaryl ethers, polyfuran, polybenzimidazole, various fluoropolymers and polyether aromatics such as polyimide or polyimidazopyrrolidone. Polysulphone or polyacrylonitrile plate or tubular modules are preferably used.

All conventional commercial membrane modules, such as spirally wound, tubular, capillary or hollow fiber modules, are suitable for the reverse osmosis unit. Cushion or plate modules may be used, but are less preferred. The membranes may be manufactured from the same materials as the ultrafiltration membranes. Polysulphone or polyacrylonitrile spirally wound modules are preferably used.

The same conventional commercial module types and membrane materials may be used for the nanofiltration unit as described for ultrafiltration. Cushion, plate or tubular modules of polypiperazinamide, polysulphone or polyacrylonitrile are preferably used.

The process according to the invention is suitable for reconcentrating booth water/overspray mixtures formed during the processing of one-component, aqueous coating compositions. Examples of these compositions include physically drying coating compositions based on polyurethane or polyacrylate dispersions, coating compositions based on fatty acid-modified, polyurethane or polyacrylate dispersions, aqueous coating compositions based on polybutadiene, unsaturated polyesters or polyacrylates or coating compositions containing based on hydroxy-functional polyesters, polyacrylates or polyurethanes combined with amino resins or blocked polyisocyanates as cross-linking resins.

Pigments, fillers and other additives for coating compositions, such as levelling agents, gloss improvers, antisedimentation agents, thickeners, thixotropic agents, antioxidants and thermal stabilizers, which may optionally be present in the coating compositions, may also be reconcentrated.

The binders of the coating compositions are either dissolved or dispersed by the use of internal or external emulsifying agents. The transitions between these states are fluid. The binders generally have average molecular weights of 2,000 to 100,000 g/mol, and frequently have broad molecular weight distributions so that low molecular weight components having molecular weights of less than 2,000 g/mol may also be present. The low molecular weight components exert a decisive influence on important product properties such as flow and gloss.

The cross-linking resins in stoving systems, such as amino cross-linking resins or blocked polyisocyanates, conventionally have average molecular weights of 500 to 2,000 g/mol. Therefore, they make a substantial contribution to the proportion of low molecular weight components in stoving coating compositions.

In the case of anionically modified binders the coating composition additionally contains amines, such as ammonia, triethylamine or dimethylethanolamine, as neutralizing agents. The degree of retention of these amines in the reverse osmosis stage is also high.

The majority of water-reducible coating compositions contain 0.1 to 15%, preferably 0.5 to 10%, of low molecular weight solvents such as glycolether, N-methylpyrrolidone or methoxypropylacetate. These solvents are also have an important influence on the properties of the resulting coatings.

In the coating compositions used in the process according to the invention, the proportion of components having a weight average molecular weight of less than 2,000 g/mol is at least 5 wt-%, preferably 10 to 60 wt-%; the proportion of components having a molecular weight of less than 1,000 g/tool is preferably at least 5 wt-%; and the proportion of coating components having a molecular weight of less than 500 g/mol, preferably less than 200 g/mol, is at least 0.5 wt-%, preferably at least 1.0%. The preceding percentages are based on the total weight of the organic components of the coating compositions.

The solids content of these coating compositions is generally about 20 to 70, preferably 30 to 70 wt-%, while that of the overspray diluted with the spray booth water is generally about 0.05 to 20, preferably 0.5 to 10 wt-%. In the context of the present invention "reconcentration" means the recovery from the overspray/booth water of an aqueous coating composition having virtually the original composition such that it may be reused as a coating composition or as a constituent of a coating composition.

The process according to the invention is suitable for all one-component, aqueous coating compositions which have previously been worked up solely by ultrafiltration. Preferably, the process according to the invention is used with coating compositions which either cannot be worked up by ultrafiltration or which are obtained in an unsatisfactory form due to the loss of components essential to the coating composition.

FIG. 1 set forth the process according to the invention in which:

(1) represents the booth water circuit;

(2) represents the part of the booth water circuit containing a booth water/overspray mixture to be reconcentrated;

(3) represents the ultrafiltration stage;

(4) represents the retentate from ultrafiltration;

(5) represents the permeant from ultrafiltration;

(6) represents the reverse osmosis stage;

(7) represents the retentate from reverse osmosis;

(8) represents the permeant from reverse osmosis;

(9) represents the nanofiltration stage;

(10) represents the retentate from nanofiltration and

(11) represents the permeant from nanofiltration.

Figure 2:
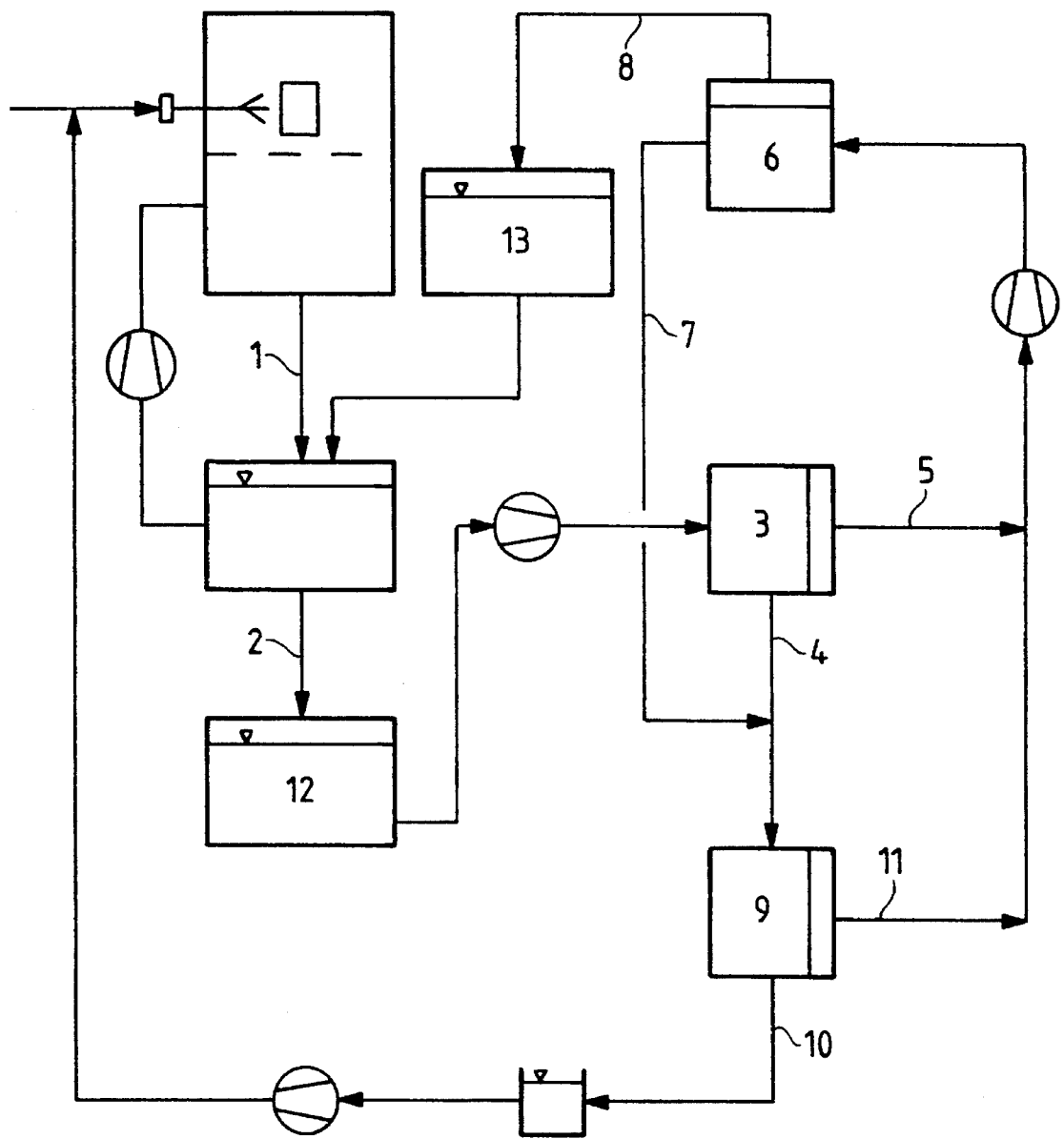
FIG. 2 is a flow chart of a first embodiment of a batch process according to the invention.
Figure 3:
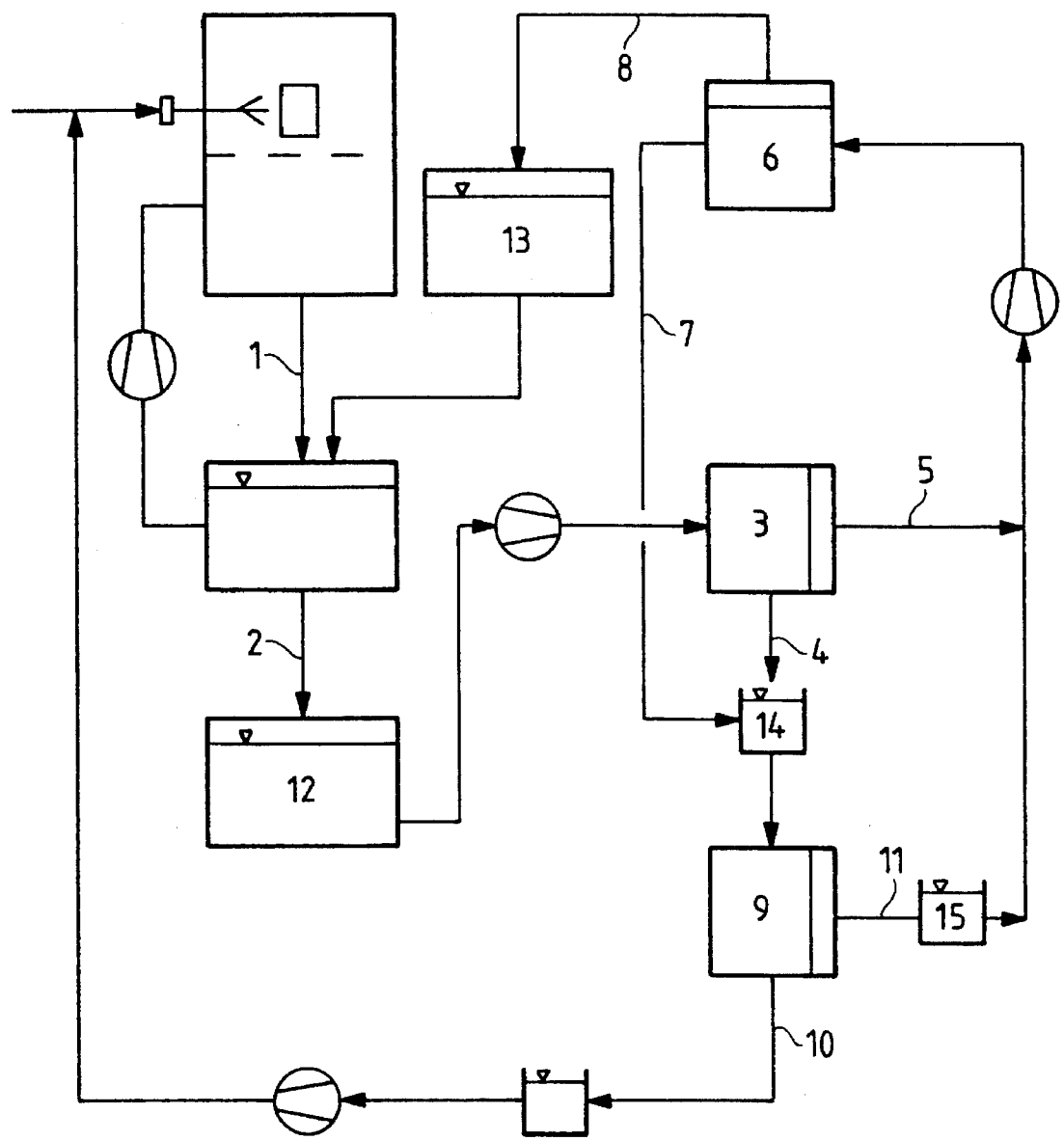
FIG. 3 is a flow chart of a second embodiment of a batch process according to the invention.

FIGS. 2 and 3 set forth other embodiments of the invention, in which the process according to the invention is carried out in batch-wise manner. In these FIGS. (1) to (11) are defined as previously set forth and additionally

(12) represents an intermediate tank for the booth water/ overspray mixture which is to be supplied to reconcentration;

(13) represents an intermediate tank for the permeant from reverse osmosis which is virtually pure water for reuse;

(14) represents an intermediate tank for the permeant from the reverse osmosis stage and

(15) represents an intermediate tank for permeant from the nanofiltration stage.

The mixture of booth water and overspray (2), which is to be reconcentrated according to the invention, represents either the total quantity of mixture from wet extraction of the overspray or a portion of the mixture leaving the booth. In order to carry out the process according to the invention, the mixture (2) is guided into an ultrafiltration stage (3). In the ultrafiltration stage (3) the high molecular weight coating components are pre-concentrated in the retentate (4) to 10 to 90 wt-%, preferably from 25 to 75 wt-%, of the original coating concentration. The major part of the low molecular weight coating components are in the permeant (5) from the ultrafiltration stage. They are reconcentrated in a reverse osmosis stage (6) to form the reverse osmosis retentate (7). The permeant (8) from the reverse osmosis stage contains virtually pure water and is returned into the booth circulation water circuit (1). The reverse osmosis retentate (7) is mixed with the ultrafiltration retentate (4) and reconcentrated in a nanofiltration stage (9) until the nanofiltration retentate (10) has attained the original coating concentration and, thus, virtually the original coating composition and quality. The nanofiltration retentate may therefore be used again without further modification as a ready-to-spray coating composition for the same purpose, or may be admixed with fresh coating composition. The nanofiltration permeant (11), which contains small proportions of low molecular weight compounds that do not remain in the retentate (10), is mixed with the ultrafiltration permeant (5) and supplied to the reverse osmosis stage (6).

The permeant (8) leaving the reverse osmosis stage (6) generally contains "virtually pure" water. This means that the maximum organics of this permeant is generally less than about 0.5, preferably less than 0.1 wt-%.

It is possible in accordance with the present invention to ultimately obtain as the nanofiltration retentate (10), an aqueous coating composition which largely corresponds in composition and concentration to the original coating composition used. This is attributable principally to the step in the process in which the retentate (7) from reverse osmosis undergoes nanofiltration (9) together with the retentate (4) from ultrafiltration. Despite the limited extent to which low molecular weight components retained in the reverse osmosis are retained by nanofiltration, the reconcentration of such low molecular weight components from the combined permeants (5) and (11) has the effect of adjusting the balance and results in the presence of such low molecular weight components in the retentate (10), specifically in a percentage which corresponds to their percentage in mixture (2) or in the original coating composition.

The continuous process according to the invention enables the solids content in the booth circulation water circuit (1) to be maintained permanently at a constant value of 0.05 to 20 wt-%, preferably 0.5 to 10 wt-%.

The process according to the invention may also be carried out batchwise (FIGS. 2 and 3). In this case the overspray/booth water mixture (2) is first pumped from the booth circulation water circuit (1) into an intermediate tank (12). Thereafter, as in the continuous process, the high molecular weight components are pre-concentrated in the ultrafiltration stage (3), the low molecular weight components are reconcentrated in the reverse osmosis stage (6) and the final concentration takes place in the nanofiltration stage (9). The reverse permeant (8) is collected in a tank (13) for subsequent reuse as booth water.

In a second embodiment of the batchwise process, which is less preferred, the ultrafiltration, reverse osmosis and nanofiltration stages may be carried out independently of one another (FIG. 3). In this case the overspray/booth water mixture from the intermediate tank (12) is first preconcentrated in the ultrafiltration stage (3). The ultrafiltration retentate (4) is first collected in a further intermediate tank (14). The ultrafiltration permeant (5) is reconcentrated in the reverse osmosis stage (6). The reverse osmosis permeant (8) is collected in the tank (13) for reuse as booth water. The reverse osmosis retentate (7) is mixed with the ultrafiltration retentate (4) in the intermediate tank (14) and is supplied to the nanofiltration stage (9), where re-concentration takes place until the original coating composition concentration is reached. The nanofiltration permeant (11) is collected in a tank (15). It is mixed into the ultrafiltration permeant (5) upstream of the reverse osmosis stage (6) during the next reconcentration operation.

In the process according to the invention all of the auxiliary substances and additives present in the overspray are also present practically without loss in the retentate (10) which is ultimately obtained. Accordingly, the only losses which must be made up in the process according to the invention are for the volatile coating components which may result from evaporation. Demineralized water is used as the booth water.

In the process according to the invention known materials and pumps are used in the individual separation stages, provided that they enable the process conditions according to the invention to be maintained. Pumps which are preferably used are those which subject the material to the lowest possible shear stress, e.g., diaphragm-actuated pumps.

The process according to the invention is generally carried out at room temperature (for example, 15° to 25° C.). It may be necessary to cool the mixtures because of heat generated by friction during the process.

In most cases it is possible to reuse the resulting compositions without further modification. However, in order to avoid fluctuations in quality it is also possible before reuse to mix with the concentrate a quantity of fresh coating composition corresponding to the quantity arising through overspray in this case the retentate is used as a constituent of a new coating composition.

The examples which follow aim to explain the invention in greater detail without, however, restricting it. The advantages of the process according to the present invention may be seen by comparing the example according to the invention with the comparison example. All parts and percentages are by weight unless otherwise specified.

EXAMPLE 1

The following coating composition was applied by spraying:

49.5% polyester-polyurethane dispersion (at a concentration of 42% in a 52.3:4.6 blend of water/N-methylpyrrolidone, neutralized with 1.1% dimethylethanolamine, weight average molecular weight =11,000, non-uniformity U=3.0)

29.7% white pigment (Bayertitan R-KB-4, available from Bayer AG)

9.9% amino cross-linking resin (Luwipal LR 8839, available from BASF AG, 90% in isobutanol)

8.5% water 1.2% dimethylethanolamine 1.0% flow aid (Tegopren 100, Tego Chemie Service GmbH, 10% in water)

0.2% cross-linking agent (Fluorad FC 129.3 M)

The coating was diluted with water to a spraying viscosity of 35 s (DIN-4-beaker/23° C.) before spray application. The solids content was about 59% and the pH was about 8.8.

Demineralized water was used as the booth water.

The solids content of the booth water/overspray mixture was 5% when the spraying operation was complete.

A polyacrylonitrile membrane having an exclusion limit of 50,000 g/mol was used in the ultrafiltration stage for preconcentration. Ultrafiltration was continued at a pressure of 4 bar until the solids content of the retentate was 30%.

Reconcentration of the combined permeants from the ultrafiltration and nanofiltration stages took place in the reverse osmosis stage using a modified polyamide membrane capable of over 98% retention of common salt at a pressure of 30 bar. The permeant, containing less than 0.1% organics, was reused as the booth water in the next spraying operation.

The combined retentates from ultrafiltration and reverse osmosis were reconcentrated to the original solids content of 59% in the nanofiltration stage which took place in parallel with ultrafiltration and reverse osmosis. A polypiperazinamide membrane having an exclusion limit of 1,000 g/mol was used at a pressure of 20 bar. The nanofiltration permeant was mixed with the ultrafiltration permeant and supplied to the reverse osmosis unit.

The resulting coating composition was identical to the original coating composition in all properties relating to coating technology, including hardness, drying rate, gloss and resistance to condensation or solvent, thus enabling it to be reused as a coating composition for the same purpose without modification.

EXAMPLE 2

(not according to the invention)

The same coating composition as in Example 1 was applied by spraying.

In this example reconcentration was performed solely by ultrafiltration. The membrane was a polyacrylonitrile having an exclusion limit of 50,000 g/tool, as in the ultrafiltration stage of Example 1.

The working pressure was 4 bar. The pH was held constant at 8.8 by the addition of dimethylethanolamine. Reconcentration had to be terminated when the solids content reached only 48% because the permeant flow had dropped to 0.6 $l/m^2/h$.

At this time 40% of the amino resin used had passed through the membrane. Even after the addition of amino resin to make for its loss in the permeant, it was not possible to prepare coatings having the gloss, solvent resistance and hardness of the original coating. Thus, it was not possible to use the retentate for the preparation of coating compositions without loss of properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multi-stage membrane filtration process for reconcentrating overspray from a one-component aqueous coating composition containing high molecular weight components having a weight average molecular weight of at least 2000, and at least 5 % by weight of a low molecular weight component having a weight average molecular weight of less than 2000, based on the total weight of organic components of the coating composition, said overspray having been diluted with spray booth water from spray booths having wet flushing, to form a booth/water overspray mixture, said process comprising a) preconcentrating the booth water/overspray mixture in an ultrafiltration unit to obtain a first retentate containing high molecular weight components and a first permeant containing water and at least a portion of the low molecular weight components, b) treating said first permeant in a reverse osmosis unit to obtain a second permeant containing essentially pure water for recycled as booth water and a second retentate containing low molecular weight components, c) treating said first and second retentate in a nanofiltration unit to obtain a third permeant containing water and a minor portion of low molecular weight components and a third retentate which largely corresponds in composition and concentration to said one-component aqueous coating composition, and d) recycling said third permeant to the reverse osmosis unit for treatment in accordance with step b).

2. The process of claim 1 which comprises maintaining a differential pressure of 1 to 10 bar in the ultrafiltration unit, and maintaining a different pressure of 12 to 40 bar in the nanofiltration unit.

3. The process of claim 1 which comprises introducing said booth water/overspray mixture into a first intermediate tank before it is preconcentrated in accordance with step a).

4. The process of claim 1 which comprises introducing said second permeant into a second intermediate tank before it is recycled as boot water.

5. The process of claim 1 which comprises introducing said first and third retentates (4) and (7) into a third intermediate tank (14) before they are treated in accordance with step c).

6. The process of claim 1 which comprises introducing said third permeant into a fourth intermediate tank before it is treated together with said first permeant in accordance with step b).

\* \* \* \* \*